(12) United States Patent
Gomez et al.

(10) Patent No.: US 6,537,061 B1
(45) Date of Patent: Mar. 25, 2003

(54) CATALYTIC AFTERBURNER AND BOTTLE EQUIPPED WITH SAME

(75) Inventors: Corinne Gomez, Louviers (FR); Jannick Lehoux, Thuit-Signol (FR)

(73) Assignee: Produits Berger (FR)

( * ) Notice: Subject to any disclaimer, the term of this patent is extended or adjusted under 35 U.S.C. 154(b) by 0 days.

(21) Appl. No.: 09/700,122

(22) PCT Filed: Apr. 20, 1999

(86) PCT No.: PCT/FR99/00937

§ 371 (c)(1), (2), (4) Date: Jan. 2, 2001

(87) PCT Pub. No.: WO99/63267

PCT Pub. Date: Dec. 9, 1999

(30) Foreign Application Priority Data

Jun. 4, 1998 (FR) .............................................. 98 07043

(51) Int. Cl.⁷ ........................... F23Q 11/04; F23D 3/02; F23D 3/24

(52) U.S. Cl. ........................ 431/268; 431/321; 431/324; 431/328

(58) Field of Search .................................. 431/268, 320, 431/321, 322, 323, 327, 319, 147, 326, 328, 170, 7, 324; 60/723

(56) References Cited

U.S. PATENT DOCUMENTS

| | | | | |
|---|---|---|---|---|
| 1,956,749 A | * | 5/1934 | Terret | 431/268 |
| 3,240,256 A | * | 3/1966 | Binkley et al. | 431/268 |
| 6,162,046 A | * | 12/2000 | Young et al. | 431/11 |

FOREIGN PATENT DOCUMENTS

| | | | |
|---|---|---|---|
| DE | 3436310 A | * | 4/1986 |
| EP | 0 277 875 A | * | 10/1988 |
| FR | 2 530 144 A | * | 1/1984 |
| FR | 2 579 465 A | * | 10/1986 |

* cited by examiner

*Primary Examiner*—Henry Bennett
*Assistant Examiner*—Josiah C. Cocks
(74) *Attorney, Agent, or Firm*—Bachman & LaPointe, P.C.

(57) ABSTRACT

The invention concerns a catalytic combustion afterburner made of porous material, comprising in its lower part a substantially axial cavity for receiving a taper designed to convey to the burner a combustible liquid, and in its upper part an annular peripheral zone bearing a catalyst and enclosing a central zone without catalyst forming a vaporizing zone. The afterburner comprises in its upper part an open duct, communicating the cavity upper part with the outside air.

14 Claims, 1 Drawing Sheet

CATALYTIC AFTERBURNER AND BOTTLE EQUIPPED WITH SAME

The present invention relates to a catalytic combustion burner made of porous material, comprising in its lower part an substantially axial cavity for receiving a wick designed to convey a combustible liquid to the burner, and in its upper part an annular peripheral zone carrying a catalyst and surrounding a central zone with no catalyst forming a vaporising zone.

By way of example such a burner was described in patent FR-B-2 610 390 in the name of the present applicant.

The combustible liquid conveyed by the wick penetrates into the pores of the burner's porous material. Some of this liquid reaches the annular peripheral zone with the catalyst and there undergoes catalytic combustion, which keeps this peripheral zone at a high temperature.

Another part of this liquid passes through the central zone of the burner and is vaporised there.

It is recommended that combustible liquid be regularly topped up in a flask equipped such a kind of burner. However, experience shows that many users forget to turn off the burner and leave it alight until the combustible liquid is entirely used up.

When there is no more combustible liquid in the flask, the wick dries out, and its upper end, trapped in the upper part of the burner cavity, and being in contact with its hot walls, tends to burn in the absence of oxygen and to carbonise, producing free particles of carbon which in turn block up the pores of the burner. The same thing occurs with the last usable amounts of the combustible liquid conveyed at a decreasing rate by the wick, which no longer pass through the walls of the burner and the incomplete combustion of which likewise frees amorphous carbon particles. As a result the efficiency of the burner is reduced, it becomes unusable and it has to be chanqed.

FR-B-2 483 782 and FR-A-2 530 144, in the applicant's name, describe a burner in the form of an annular catalytic disk made of inert materials into which is mixed a catalyst. This disk has an axial hole through it into which a skirt is inserted, which reaches as far as a tubular wick and contains no catalyst. The upper part of the tubular wick surrounds the skirt under the annular disk. There is a second wick inside the tubular wick, inserted inside the skirt.

No burner of this kind has ever gone beyond prototype stage, partly because of its complexity, and partly because the two wicks tend to carbonise rapidly in contact with the hot annular catalytic disk.

The purpose of the invention is to overcome the drawbacks of the problems relating to the catalytic combustion burner of the aforementioned type and to put forward a burner of the same type where there is no risk of the wick carbonising, even if a user forgets to turn off the burner and leaves it alight until the combustible liquid contained in the flask is completely used up.

In the present invention, the particular feature of the catalytic combustion burner of the aforementioned type is that it has in its upper part at least one open channel enabling the upper part of the cavity to communicate with the atmosphere.

The open channel enables oxygen to be fed continuously into the upper part of the cavity. Once the combustible liquid has been entirely used up, the dried out wick therefore, in contact with the walls of the burner, should the latter be too hot, burns the constituents of the wick completely along with the last amounts of combustible liquid, producing $CO_2$ and $H_2O$ in gas form. This prevents the production of carbon particles, which might block the burner's pores.

Furthermore, fresh air can arrive via the channel, accelerating cooling of the cavity interior walls, such that wick combustion ends earlier than in the previous situation.

In contrast to the case of the above-mentioned annular catalytic disc burner, where the coaxial wicks carbonised rapidly in contact with the walls of the annular disc despite the presence of the axial hole containing the central wick, the open channel, because it provides for communication between the upper part of the cavity and the atmosphere, is sufficient, even if its diameter is small in comparison with that of the cavity, for carbonisation to be avoided.

As a result, it is possible to leave the burner alight until all the combustible liquid in the flask with said burner is consumed without risk of damaging said burner.

In one advantageous version of the invention, said channel is substantially axial and preferably has a diameter of substantially a quarter to a half of the diameter of the cavity.

Another aspect of the invention also relates to a catalytic combustion flask, suitable for containing combustible liquid, the neck of which holds a catalytic combustion burner with a wick dipping into said liquid.

In this invention, this flask is characterized in that it is equipped with a burner in accordance with the first aspect of the invention.

Other particular features and advantages of the present invention will become apparent in the detailed description hereinbelow.

In the accompanying drawings, which are given for illustrative and non-limiting purposes only:

Figure 1:
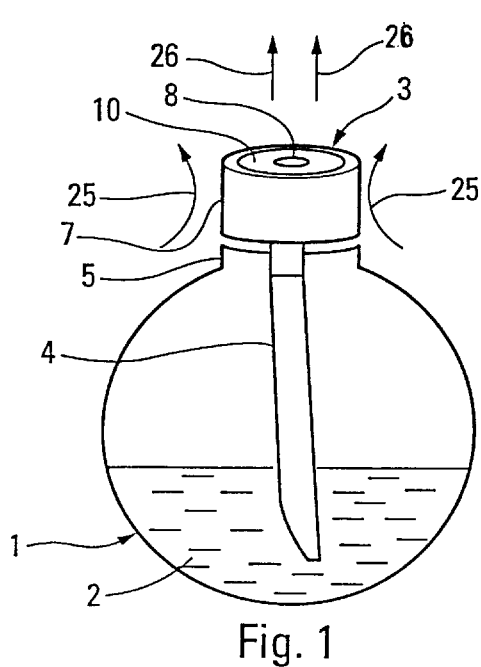
FIG. 1 is a schematic elevation view of a flask equipped with a catalytic combustion burner according to one embodiment of the present invention.

FIG. 1 shows a catalytic combustion flask 1 designed to contain a combustible liquid 2, and to hold in its upper part a catalytic combustion burner 3 with a wick 4 dipping into said liquid 2.

The flask 1 may be of any shape, with a neck 5 into which the burner 3 is fitted.

The combustible liquid 2 is usually an alcohol, for example isopropyl alcohol, or any other appropriate combustible liquid meeting applicable regulations. In particular, this liquid must be such that on vaporisation and catalytic combustion no unpleasant odor is released.

The combustible liquid may additionally include a perfume and/or an active ingredient.

The wick 4 is of any type already known, for example made of cotton, or of a mineral substance, for instance mineral fibre.

Figure 2:
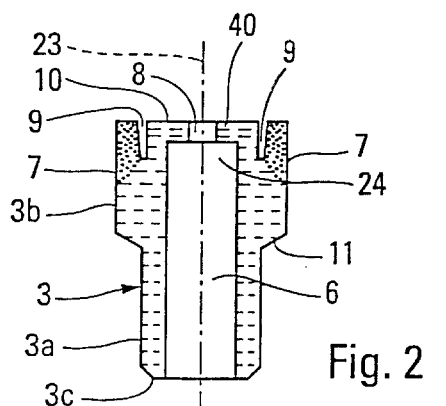
FIG. 2 is an enlarged diagrammatic axial sectional view of the burner shown in FIG. 1.

As shown in detail in FIG. 2, the catalytic combustion burner 3 is made of a porous substance, for example of a kaolin base.

The lower part 3a of the burner 3 includes a cavity 6, substantially axial, to hold a wick 4 conveying combustible liquid 2 to the burner 3. The cavity 6, which opens at the lower end 3c of the burner 3, extends axially over a large part of the axial dimension of the burner 3.

In the upper part 3b of the burner 3 there is an annular peripheral zone 7 carrying a catalyst, based for example on a metal from group VIII of the periodic table. The annular peripheral zone 7 surrounds a central zone 40 with no catalyst, this being the vaporisation zone.

According to the invention this burner is characterized in that the upper part 3b of the burner 3 includes at least one open channel 8, enabling the upper part 24 of the cavity 6 to communicate with the atmosphere.

In the example shown, the channel 8 is laid out substantially axially, particularly for aesthetic reasons.

The channel could very well be in another direction than axial, provided that it may still bring fresh air into the upper part 24 of the cavity 6 without interfering with catalytic combustion.

The channel 8 preferably has a diameter of between a quarter and about three quarters of the diameter of the cavity 6.

Thus for a cavity with an interior diameter of about 7 mm, the channel will preferably have a diameter of between 2 and 3 mm.

As shown in FIG. 2, and as is conventional, the burner 3 has an approximately axial annular groove 9 extending from the upper surface 10 of the burner 3 towards the bottom with a diameter greater than that of the cavity 6.

FIG. 2 shows that the annular groove 9 extends axially over a greater distance than the thickness of the wall separating the cavity 6 from the upper surface 10 of the burner.

This groove 9 clearly separates the peripheral zone 7 with the catalyst from the central zone 40 of the upper part 3b.

Catalytic combustion of the combustible liquid and catalytic destruction of gaseous organic substances present in the air surrounding the burner take place in contact with the peripheral zone 7 having the catalyst, as indicated by the arrows 25 in FIG. 1. This zone 7 is, while the burner is alight, at a temperature of several hundreds of degrees centigrade.

In the central zone 40, separated from the peripheral zone 7 by the annular groove 9, the temperature is much lower. Here there is simply vaporisation of the combustible liquid and dispersion of the perfumed matter contained in this liquid, as indicated by the arrows 26 in FIG. 1.

As schematically shown in FIG. 2, the burner 3 has a peripheral shoulder 11 separating its larger diameter upper part 3b from its smaller diameter lower part 3a.

The shoulder 11 is held by an additional shoulder 12 in a support 13 surrounding at least the lower part 3a of the burner 3.

The burner 3 may be held in the support 13 by a bracket (not shown) the ends of which go into the notches 27 in the wall forming the shoulder 12 of the support 13.

The burner 3 may be held in its support 13 by any other means, for example by crimping the substantially cylindrical lower part 13a of the support 13 around the lower part 3a of the burner 3.

Figure 3:
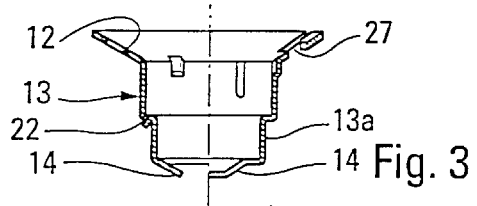
FIG. 3 is a view similar to FIG. 2 showing one embodiment of a support of the burner in FIG. 2.

In the example shown in FIG. 3, the support 13 has an axial length substantially equal to the axial length of the lower part 3a of the burner 3.

In the lower part, the support 13 has several lugs 14 which go substantially radially inwardly so that they tighten and hold the wick 4 inside the cavity 6 of the burner 3 in place on the support 13.

The support 13 may be placed directly inside the neck 5 of the flask 1.

Usually, the support 13 is placed in the central hole 15 of a base 16 fitted inside the neck 5 of the flask 1. As schematically shown in FIG. 4, the base 16 has, for example, a lower skirt 17 which can be crimped around an annular enlargement, schematically shown at 18 in FIG. 4, of said neck 5.

Figure 4:
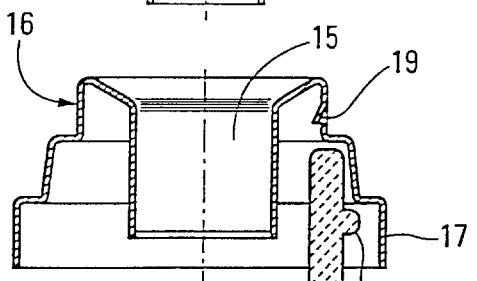
FIG. 4 is a view similar to FIG. 2 showing one embodiment of a base for receiving the support in FIG. 3.
Figures 5, 6:
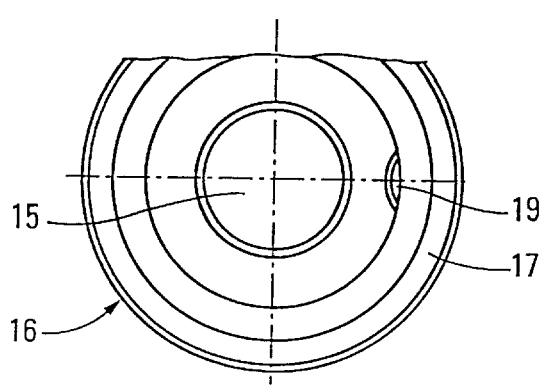
FIG. 5 is an underside view of the support in FIG. 3.
FIG. 6 is an underside view of the base in FIG. 4.

FIGS. 4 and 6 show that the base 16 has at least one hole 19, enabling the inside of the flask 1 to communicate with the atmosphere. In this example, the hole 19 appears in a peripheral wall 20 placed above the neck 5 and communicating directly with the inside of the flask 1.

Advantageously, the support 13 extends downwards beyond the lower end 3c of the burner 3.

Figure 7:
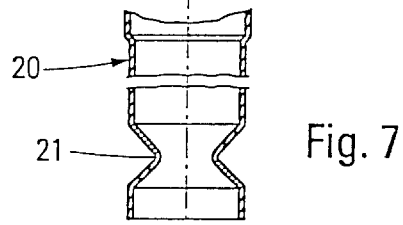
FIG. 7 is a view similar to FIG. 2 showing one embodiment of a tubular extension of the support in FIG. 3.

In the example shown in FIG. 7, the support 13 is extended downwards beyond the lower end 3c of the burner 3 by a tubular extension 20, which fits on the lower part of the support 13.

In this example, the tubular extension 20 has at least one section with a constriction 21 to grip the wick 4 and to limit the amount of combustible liquid it conveys to the burner 3 by capillary action. Likewise, the support 13 contains at least one hole 22 enabling the inside of the flask 1 to communicate with the atmosphere.

The principal purpose of the support 13, extended or equipped with a tubular extension 20, is to encourage the user of the burner 3 to perfectly place the support 13 and the burner 3, on the base along an axis 23 which is common to the neck 5, the base 16, the extension 20, the support 13 and the burner 3. This is to avoid the error consisting of lighting a burner 3 when this burner is not in the correct position on the base 16, which means that the flame from the combustion of the combustible liquid at the surface of the burner is able to extend through the wick to the inside of the flask 1 in which there might be an explosive mixture of air and of combustible liquid vapour.

The heavier assembly formed by the burner 3, the support 13, the tubular extension 20 and the wick 4 tends to set itself in place on the base on its own 16. Should it not do so, this assembly, if it is not placed inside the central hole 15 of the base 16, tends to hang completely outside the flask, in an unusual position, which encourages the user to replace everything in the normal axial position.

The tests carried out by the applicant with the improved burner described above and a flask equipped with such a burner placed on a support 13 with an extension 20 and inserted into a base 16 with a hole 19, have demonstrated that the corresponding improvements do indeed produce the expected results.

The channel 8 fitted into the upper part 3b of the burner 3 efficiently avoids incomplete combustion of the combustible liquid and of the wick when the combustible liquid contained in the flask has been completely used up. Thus any production of carbon particles which might block and damage the burner 3 is avoided. Furthermore, this channel 8 facilitates the upper part 3b of the burner 3 to be cooled, such that the amount of perfumed liquid consumed does not rise.

The presence of the channel 8 moreover enables perfumed substances to be used in the combustible liquid 2, which may be chosen from a wider diversity of ranges than those used with a conventional burner where they need to cross through the pores.

Thus it is possible to use perfumed substances which have lighter olfactory notes, fruity or otherwise, for example citrus, particularly those coming from the lemon family, which may be vaporised directly as they pass through the channel (8) without going through the pores of the burner which are at a temperature of the order of 200° C., at which they would be destroyed.

Likewise, heavier substances might be used, for example insecticides, which could vaporise directly through the channel 8 where otherwise they would risk obstructing the burner in the absence of the channel 8.

Figure 8:
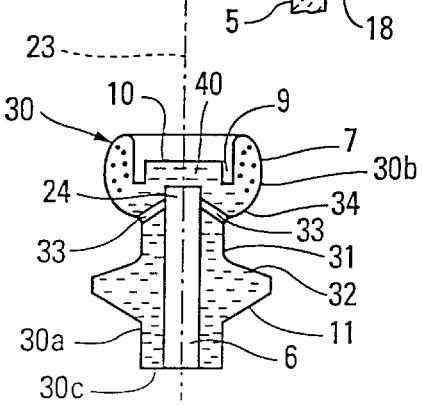
FIG. 8 is a view similar to FIG. 2 of another embodiment of the present invention.

In the embodiment shown in FIG. 8, the burner 30 has an axial cavity 6 going from its lower end 30*c* to close to its central upper wall 10 surrounded by the annular groove 9.

In this example, the peripheral zone 7, carrying the catalyst, of the upper part 30*b* of the burner 30 extends axially above the wall 10.

Below the peripheral zone 7 the lower part 30*a* of the burner 30 includes successively, in the axial direction downwards, a first substantially cylindrical wall 31 with a smaller diameter which is extended by a flared second wall 32 creating a flange whose lower peripheral surface forms the shoulder 11 held in the additional shoulder 12 of the support 13.

The peripheral wall 31 and the peripheral wall 32 are also vaporisation surfaces for the combustible liquid, in addition to the central zone 40.

As shown in FIG. 8, the upper part 24 of the cavity 6 communicates with the atmosphere by several channels 33, two in this example, which open to the outside at the base of the shoulder 34 linking wall 10 to wall 31.

The burner 30 may be fitted on to the neck 5 of the flask 1 by a support and a base of the type described above or another type.

Of course, the present invention is not limited to the embodiments that have just been described, and many changes and modifications may be made to these and still remain within the scope of the invention. In particular, features described above may be combined within themselves in any fashion.

What is claimed is:

1. A catalytic combustion burner (3, 30) in a porous material comprising an upper part (3*b*, 30*b*) having an upper surface (10) and a lower part (3*a*, 30*a*) ended with a-lower end (3*c*, 30*c*), said burner (3, 30) having a substantially axial cavity (6) with a wick (4) to convey a combustible liquid (2) to the burner (3, 30), said combustible liquid (2) penetrating into the pores of said burner's porous material, said cavity (6) comprising an upper part (24) and opening at the lower end (3*c*, 30*c*) of the burner (3, 30) and being separated from the upper surface (10) of the.burner (3, 30) by a wall, and the burner (3, 30) having an annular peripheral zone (7) carrying a catalyst and surrounding a central zone (40) with no catalyst forming a vaporization zone, said annular peripheral zone (7) and said central zone (40) being located in the upper part (3*b*, 30*b*) of said burner (3, 30), characterized in.that said upper part (24) of the cavity communicates with the atmosphere by the presence of at least one open channel (8, 33), and said channel (8, 33) being situated in the upper part (3*b*, 30*b*) of the burner (3, 30).

2. A burner according to claim 1, characterized in that said channel (8) is substantially axial.

3. A burner according to claim 1, characterized in that said channel (8) has a diameter substantially between a quarter and about three-quarters of the diameter of the cavity (6).

4. A burner according to claim 1, characterized in that said channel (8) has a diameter of substantially a quarter to a half of the diameter of the cavity (6).

5. A burner according to claim 1, characterized in that said burner (3, 30) further comprises a substantially axial annular groove (9) extending from the upper surface (10) of the burner (3, 30) and separating the annular peripheral zone (7) from the central zone (40).

6. A burner according to claim 1, characterized in that each channel is set out substantially radially.

7. A catalytic combustion flask (1), to contain a combustible liquid (2) the neck of which (5) is designed to hold a combustion catalytic burner (3, 30) with a wick (4) dipping into said liquid (2), characterized by being equipped with a burner (3, 30) according to claim 1.

8. A flask according to claim 7, with the burner (3, 30) having a peripheral shoulder (11) separating its larger diameter upper part (3*b*, 30*b*) from its smaller diameter lower part (3*a*, 30*a*), this shoulder (11) being held by an additional shoulder (12) in a support (13) surrounding at least the lower part (3*a*, 30*a*) of the burner (3, 30), characterised in that the support (13) extends downwards beyond the lower end (3*c*, 30*c*) of the burner (3, 30).

9. A flask according to claim 8, characterized in that the support (13) is extended downwards, beyond the lower end (3*c*, 30*c*) of the burner (3, 30), by a tubular extension (20).

10. A flask according to claim 9, characterized in that the tubular extension (20) has at least one section with a constriction (21) to grip the wick (4) and to limit the amount of combustible liquid (2) it conveys to the burner (3, 30) by the capillary action of the wick (4).

11. A flask according to claim 8, characterized in that the support (13) contains at least one hole (22) enabling the inside of the flask (1) to communicate with the atmosphere.

12. A flask according to claim 7, with the burner resting on a base fixed into the neck of said flask, characterized in that said base has at least one hole enabling the inside of the flask to communicate with the atmosphere.

13. A catalytic combustion burner in a porous material, paving in its lower part a substantially axial cavity with a wick to convey a combustible liquid to the burner, and in its upper part an annular peripheral zone carrying a catalyst and being separated by a substantially axial annular groove extending from the upper surface of the burner, with a central zone with no catalyst forming a vaporization zone, characterized in that the central zone shuts off, at least in part, the upper part of the cavity and that said upper part communicates with the atmosphere by the presence of at least one open channel, said channel being situated in the upper part of the burner, and each channel being set out substantially radially.

14. A catalytic combustion flask (1), to contain a combustible liquid (2) the neck of which (5) is designed to hold a combustion catalytic burner (3, 30) with a wick (4) dipping into said liquid (2), said combustion catalytic burner having in its lower part a substantially axial cavity (6) with said wick (4) to convey said combustible liquid (2) to the burner (3, 30), and in its upper part (3*b*, 30*b*) an annular peripheral zone (7) carrying a catalyst and being separated by a substantially axial annular groove (9) extending from the upper surface (10) of the burner (3, 30), with a central zone (40) with-no catalyst forming a vaporization zone, characterized in that the central zone (40) shuts off, at least in part, the upper part (24) of the cavity (6) and that said upper part (24) communicates with the atmosphere by the presence of at least one open channel (8, 33), said channel (8, 33) being situated in the upper part (3*b*, 30*b*) of the burner (3, 30), and the burner (3, 30) resting on a base (16) fixed into the neck (5) of said flask (1), characteristics in that said base (16) has at least one hole (19) enabling the inside of the flask (1) to communicate with the atmosphere.

\* \* \* \* \*

UNITED STATES PATENT AND TRADEMARK OFFICE
CERTIFICATE OF CORRECTION

PATENT NO.     : 6,537,061 B1
DATED          : March 25, 2003
INVENTOR(S)    : Corinne Gomez and Jannick Lehoux It is certified that error appears in the above-identified patent and that said Letters Patent is hereby corrected as shown below:

Column 1,
Line 35, "chanqed" should read -- changed --.

Column 5,
Line 42, "the.burner" should read -- the burner --.
Line 47, "in.that" should read -- in that --.

Column 6,
Line 32, "paving" should read -- having --.
Line 54, "with-no" should read -- with no --.
Line 61, "characteristics" should read -- characterized --.

Signed and Sealed this

Twenty-ninth Day of June, 2004

JON W. DUDAS
*Acting Director of the United States Patent and Trademark Office*